United States Patent
Ghanwani et al.

(10) Patent No.: US 8,203,970 B2
(45) Date of Patent: Jun. 19, 2012

(54) METHOD AND APPARATUS FOR SELECTING SPANNING TREE ROOT

(75) Inventors: Anoop Ghanwani, Rocklin, CA (US); Paul T. Congdon, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1152 days.

(21) Appl. No.: 11/581,974

(22) Filed: Oct. 16, 2006

(65) Prior Publication Data
US 2008/0089246 A1   Apr. 17, 2008

(51) Int. Cl.
*G01R 31/08* (2006.01)
*H04L 12/28* (2006.01)

(52) U.S. Cl. ........ 370/256; 370/219; 370/220; 370/221; 370/225

(58) Field of Classification Search ........... 370/254–256
See application file for complete search history.

(56) References Cited

U.S. PATENT DOCUMENTS

| | | | |
|---|---|---|---|
| 6,611,502 B1 * | 8/2003 | Seaman | 370/256 |
| 2003/0053422 A1 * | 3/2003 | Ambe | 370/256 |
| 2004/0042418 A1 * | 3/2004 | Hamada et al. | 370/256 |
| 2004/0151181 A1 * | 8/2004 | Chu et al. | 370/392 |
| 2006/0198323 A1 * | 9/2006 | Finn | 370/256 |
| 2007/0201382 A1 * | 8/2007 | Ekl et al. | 370/254 |

OTHER PUBLICATIONS

Paul Congdon "Link Layer Discovery Protocol and MIB", Mar. 7, 2002, pp. 1-20, IEEE 802.1.

* cited by examiner

*Primary Examiner* — Anh-Vu H Ly
*Assistant Examiner* — Thinh Tran

(57) ABSTRACT

One embodiment relates to a method of selecting a root node for a spanning tree. Spanning trees are simulated with different nodes as the root node. An optimality criterion is calculated for each simulated spanning tree. Another embodiment relates to a network management apparatus that includes a processor, memory for storing processor-executable instructions and data, an internal communication system, and at least one port. The memory includes a) processor-executable code configured to simulate spanning trees with different nodes as the root node, and b) processor-executable code configured to calculate an optimality criterion for each simulated spanning tree. Other embodiments are also disclosed.

13 Claims, 9 Drawing Sheets

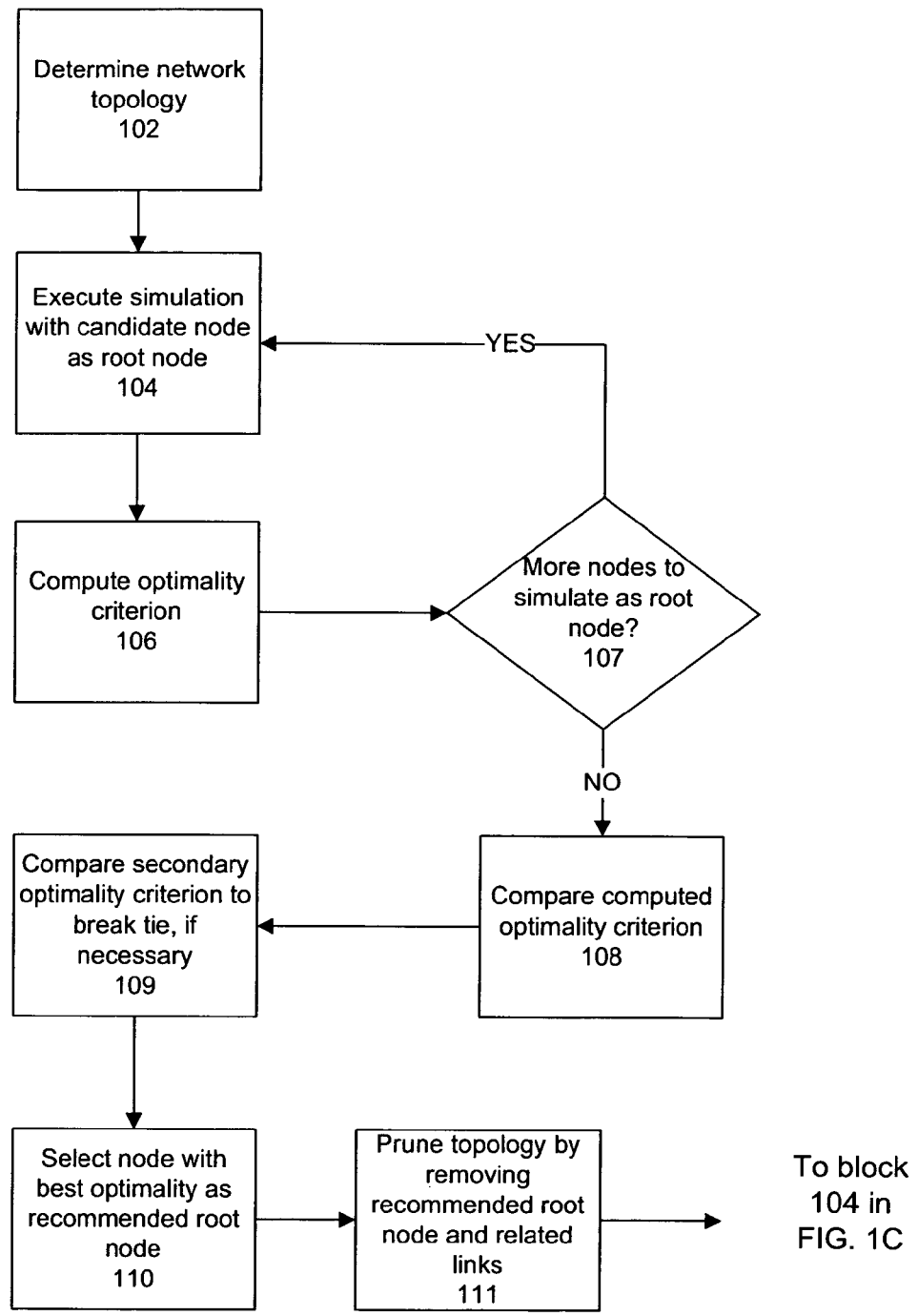
FIG. 1B    120

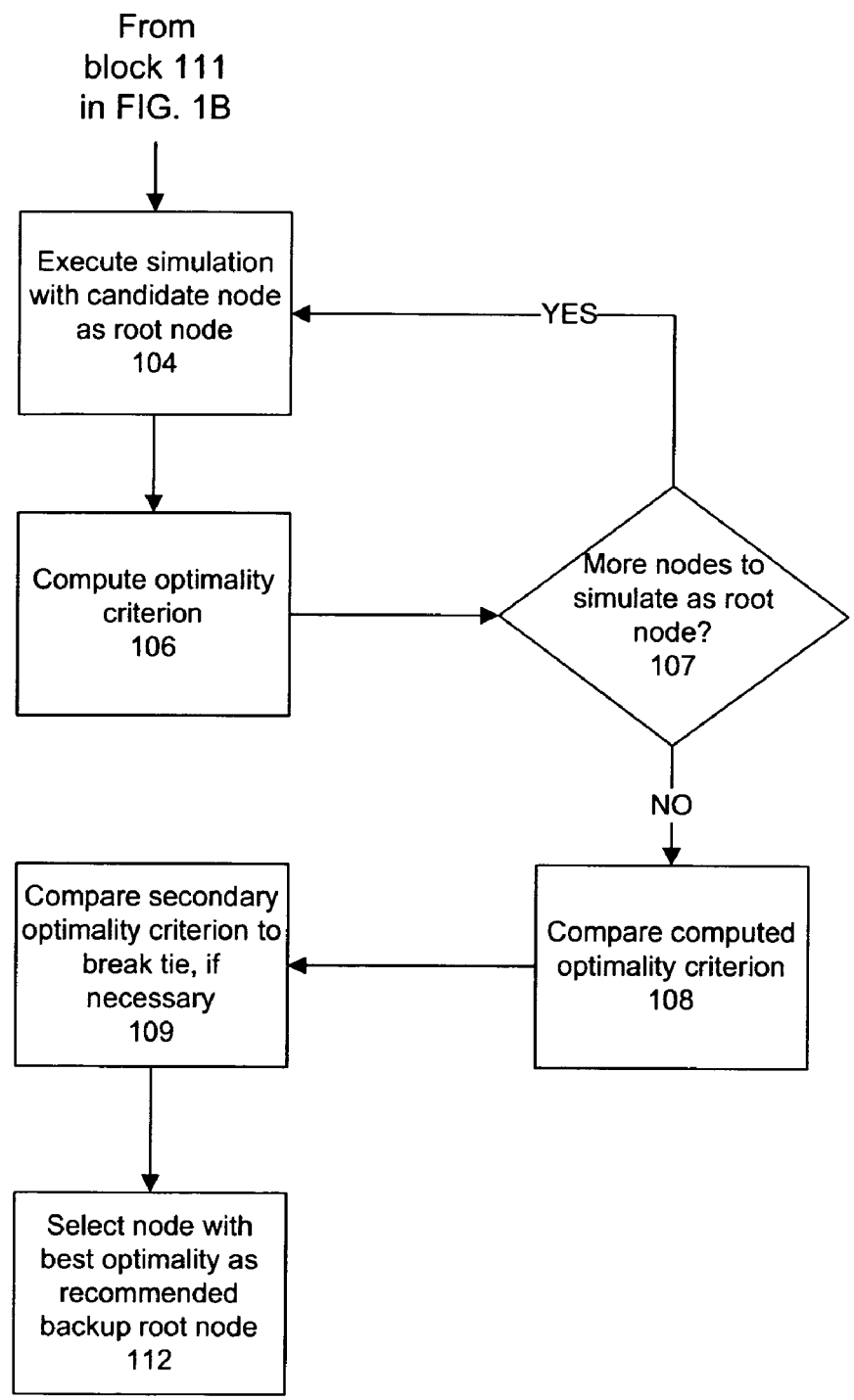
FIG. 1C        120 (Continued)

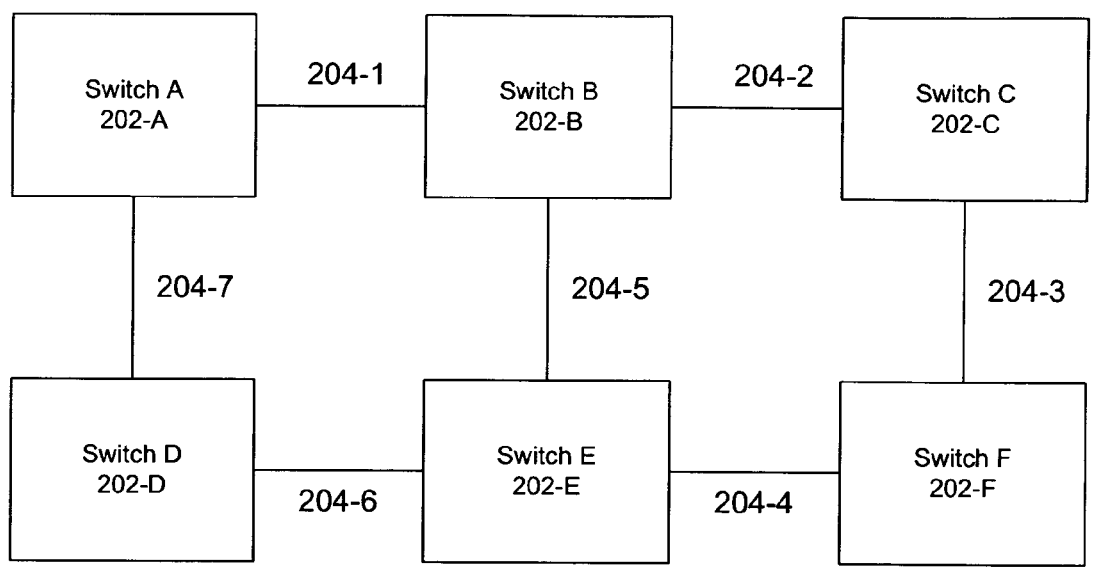
FIG. 2      200

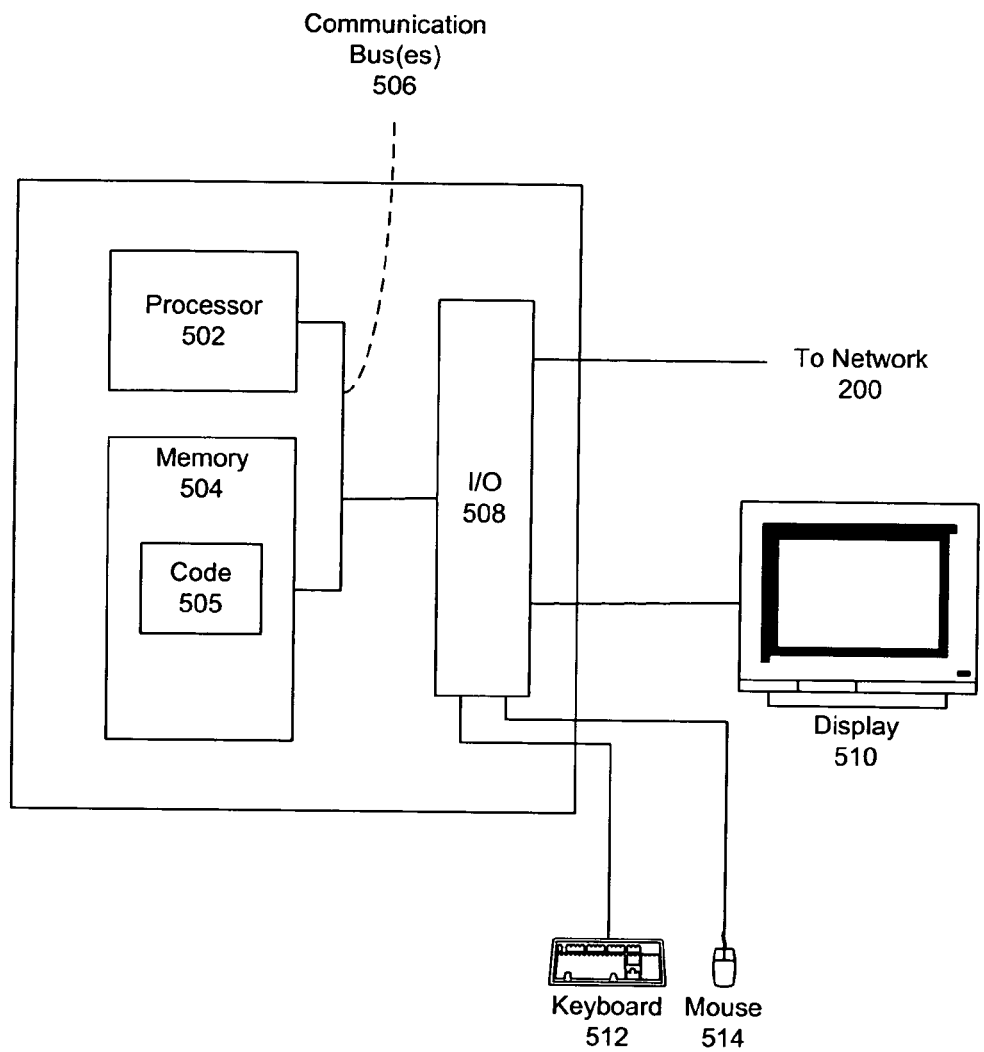
FIG. 5     402

METHOD AND APPARATUS FOR SELECTING SPANNING TREE ROOT

BACKGROUND

Description of the Background Art

Spanning tree protocol (STP) and its variants (including rapid STP or RSTP and multiple STP or MSTP) are link management protocols that prevent undesirable loops in a network while allowing for path redundancy. Undesirable loops occur when there are multiple active paths between stations. If a loop exists, a switch or bridge may see stations appearing on more than one link of the switch. This can confuse the forwarding algorithm, allowing duplicate frames to be forwarded. Further, multicast traffic entering the loop multiplies, but never leaves the loop, eventually bringing the network down.

STP computes a tree that spans all switches in an extended network and forces select redundant data paths into a standby or blocked state. If one segment of the network becomes unreachable, STP can re-establish connectivity to that segment by activating a standby path. In order to accomplish this, one switch (bridge) is designated as the root of the spanning tree. STP is a distributed protocol and relies on the exchange of messages between neighbors to compute and implement the spanning tree. When there are changes in the network due to failure or equipment upgrades, the protocol needs to recompute the tree. During such times, the forwarding of traffic may be disrupted for a period of time, sometimes referred to as the convergence time of the protocol, which can range from msec to seconds. The spanning tree is constructed as a shortest path tree from the root to all the other nodes in the network. As such selection of the root becomes a key factor in determining the tree constructed.

The spanning tree protocol is described in IEEE 802.1D and IEEE 802.1Q standards.

SUMMARY

One embodiment of the invention pertains to a method of selecting a root node for a spanning tree. Spanning trees are simulated with different nodes as the root node. An optimality criterion is calculated for each simulated spanning tree.

Another embodiment of the invention pertains to a network management apparatus that includes a processor, memory for storing processor-executable instructions and data, an internal communication system, and at least one port. The memory includes a) processor-executable code configured to simulate spanning trees with different nodes as the root node, and b) processor-executable code configured to calculate an optimality criterion for each simulated spanning tree.

Other embodiments are also disclosed.

BRIEF DESCRIPTION OF THE DRAWINGS

FIG. 1B and FIG. 1C are flow charts depicting a method of spanning tree root selection in accordance with another embodiment of the invention.

FIG. 2 is a schematic diagram depicting an example network topology for discussing the operation of the disclosed technique in accordance with an embodiment of the invention.

FIG. 5 is a schematic diagram of an example network management station.

DETAILED DESCRIPTION

As discussed above in the Background section, spanning tree protocol (STP) or one of its variants is commonly utilized to avoid undesirable loops in a network of switches or bridges.

One aspect which can substantially affect the performance of STP (and its variants) relates to the selection of the root node for the spanning tree. A sub-optimal selection of the root for the spanning tree may result in switches that are further away (in terms of path cost) from the root than necessary. In such cases, there may be sub-optimal convergence times for the protocol when recovering from link or node failures.

In conventional networks, the root of the spanning tree is typically selected arbitrarily or at random based on the MAC addresses of the nodes, or the root may be selected manually. A manually selected root node is typically selected based on the physical location of a switch within the network topology. For example, a backbone switch for a network may be manually selected to be the root node. The manual selection may be accomplished, for example, by setting an STP-related priority parameter for the backbone switch to a lowest value.

The present patent application discloses a method and apparatus for the optimal or near-optimal selection of the root node of a spanning tree. The disclosed technique selects or recommends a switch (bridge) which satisfies one or more specified optimality criteria or conditions. For example, an optimality criterion may be that the selected or recommended root switch defines a tree where the maximum cost, P_max, along any of its branches is the lowest. Another optimality criteria may be the maximum number of physical links or "hop", H_max, disregarding the actual cost of the links. Other optimality criteria or conditions may also be defined.

Figure 1A:
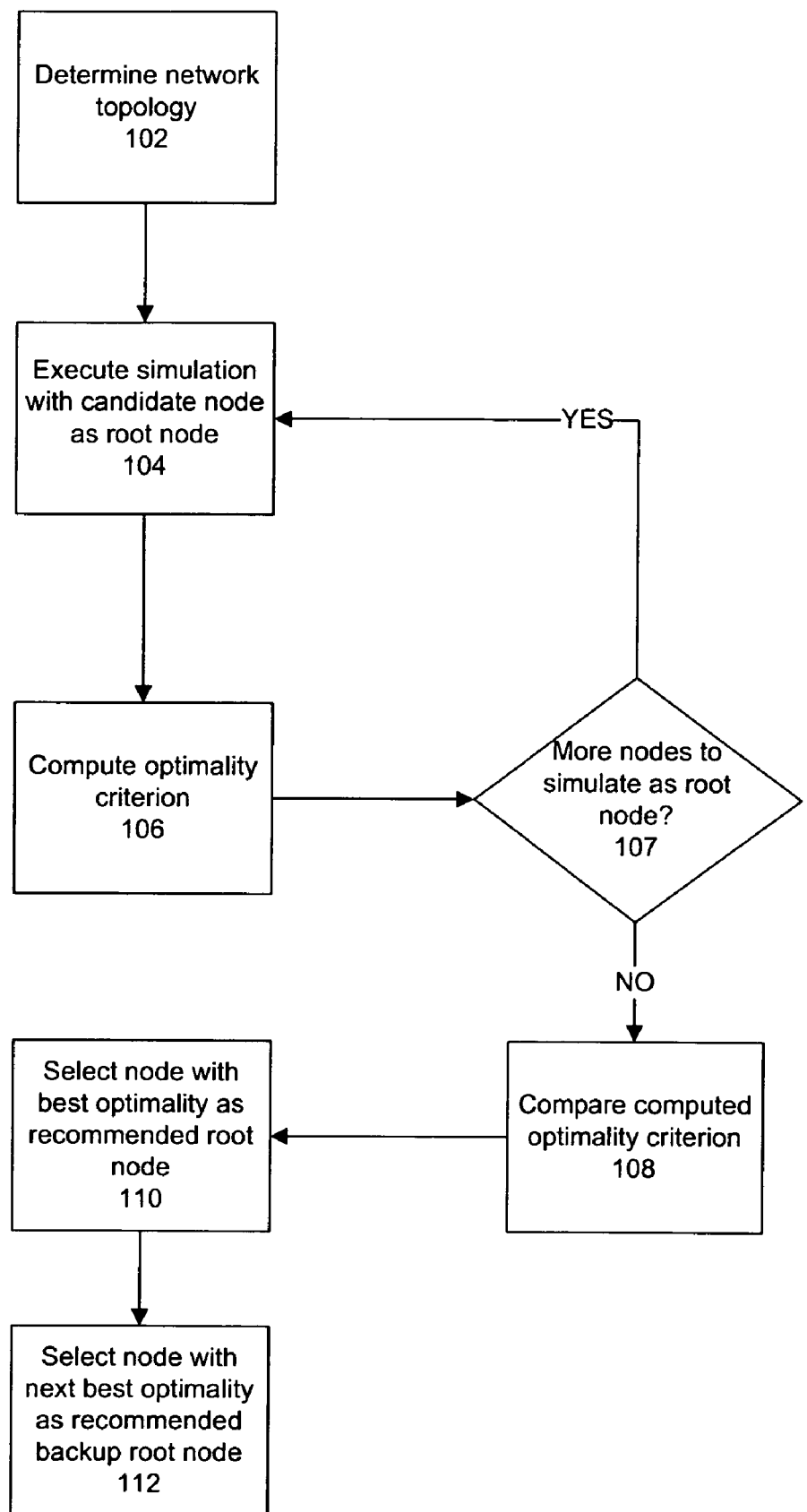
FIG. 1A is a flow chart depicting a method of spanning tree root selection in accordance with an embodiment of the invention.

FIG. 1A is a flow chart depicting a method 100 of spanning tree root selection in accordance with an embodiment of the invention. In this embodiment, both a root node and a backup root node are selected. Advantageously, this root selection may be performed in an automated manner by a network management station, and furthermore results in selected root and backup root nodes which have optimal or near-optimal convergence times.

The root selection procedure 100 may be implemented as part of a network management software application on a network management station. In a first step, the network management station may determine 102 the network topology by a reliable mechanism. This determination 102 may be accomplished, for example, by discovery of the network topology by the network management station. The discovery may be performed using a discovery protocol. In one particular embodiment, the discovery protocol may be link layer discovery protocol (LLDP). The discovery protocol may determine 102 various network topology information, such as, for example, the MAC addresses for all bridges (switches) in the network, along with the ports which link the bridges together, and the speeds of those ports.

Once the network topology is reliably determined, then for each node in the network, the network management station may execute 104 a simulation of the pertinent variant of STP, such as, for example, Spanning Tree Protocol (STP), or Rapid Spanning Tree Protocol (RSTP), or perhaps Multiple Spanning Tree Protocol (MSTP). The simulation for each node may assume that this particular node is the root node. The simulation assigns certain ports in the network topology as forwarding ports to be included in the active tree topology. Other ports may be assigned other operational states (such as, for example, discarding or learning states under RSTP).

Based on the active tree topology resulting from each simulation and the port speeds discovered via LLDP or otherwise determined, the network management station may then compute 106 one or more specified optimality criteria. In accordance with a specific embodiment of the invention, the optimality criterion used may pertain to the maximum cost, P_max, for the path to any node starting at the root in the simulated tree. Other optimality criteria may be used in alternate embodiments.

The method 100 continues to execute 104 simulations with each node as the root node and to compute 106 the optimality criterion (or criteria) until no more nodes need to be simulated as the root node (see block 107). Once the optimality criterion (or criteria) has (have) been computed 106 for each node in the network topology, then computed optimality criterion (or criteria) are compared 108. The node with the best optimality criterion may be selected 110 as the recommended root node. The node with the next best optimality criterion may be selected 112 as the recommended backup root node. In other words, each node is considered as a candidate for the root node, and a simulation is executed for each candidate to determine which is best based on the optimality criterion (or criteria).

In accordance with one embodiment, the maximum cost, P_max, from the simulations are compared 108. The node with the lowest value of P_max is selected 110 as the recommended root node. The node with the next lowest value of P_max is selected 112 as the recommended back-up root node.

In accordance with another embodiment of the invention, the procedure may be modified as follows. Consider the optimality criterion where selection is made of the node defining a tree with the lowest value of P_max. In cases where P_max turns out to be the same for two or more nodes, then the another secondary optimality criterion may be calculated for each node and those values may be compared 109 as a tie breaker. The method 120 shown in FIGS. 1B and 1C includes this tie-breaking step 109. In one particular example, the secondary optimality criterion may be P_ave, where P_ave is defined for a node as the sum of the costs for all of the shortest paths from that node to every other node in the tree divided by the number of other nodes. Between nodes with equally low P_max, the node with the lower value for P_ave may be selected as the recommended node (or recommended back-up node). If P_ave turns out also to be equal, then arbitrary selection between those nodes may be utilized.

In accordance with another embodiment of the invention, once the primary root has been selected 110, the network management station may then prune 111 the original network by removing this node and all of its links (in some sense simulating a failure of the root). Backup root selection may then be performed based on the pruned topology.

FIG. 1B and FIG. 1C are flow charts of a method 120 including the tie-breaking step(s) 109 and the pruning step 111. As shown in FIG. 1B, after the topology is determined 102, simulations are executed 104 and the optimality criterion is computed 106 until all the nodes in the topology have been simulated as the root node (see 107). The optimality criterion for the various candidate nodes may then be compared 108, and the secondary optimality criterion may be used to break ties, if necessary 109. The node with best optimallity may then be selected 110 as the recommended root node.

After selection 110 of the recommended root node, the topology is pruned 111 by removing the recommended root node and related links (i.e. all the links connecting to the recommended root node). This effectively changes the topology to a pruned topology which corresponds to a situation where the recommended root node has failed.

Thereafter, as shown in FIG. 1C, simulations are again executed 104 and the optimality criterion is again computed 106 until all the nodes in the modified topology have been simulated as the root node. The optimality criterion for the various candidate nodes may then be compared 108, and the secondary optimality criterion may be used to break ties, if necessary 109. Thereafter, the node with best optimality (given the pruned topology) may then be selected 112 as the backup root node.

If islands are formed as a result of pruning, this is an undesirable characteristic, and the network management station may flag this characteristic for the user. An island is a node or group of nodes which is not interconnected with all of the other nodes of the network topology.

Figure 6A:
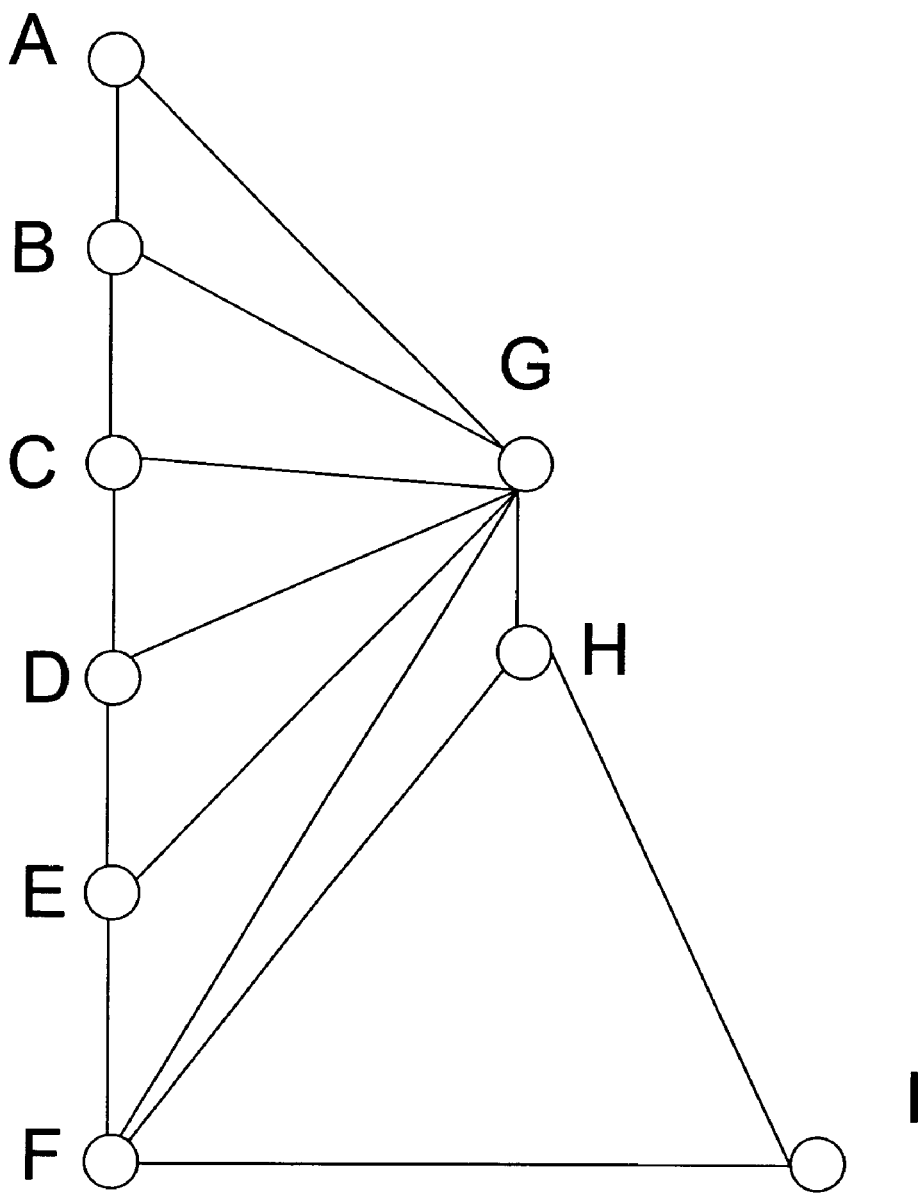
FIG. 6A depicts an example network topology.

FIG. 6A depicts an example of a network topology in which the computation of P_ave would be advantageous. Here, assume unit costs (cost=1) for each link between two nodes. In the first round of simulations to determine P_max, both node G and node H will have P_max=2. However, most (seven of eight) of G's paths have a cost of 1, while most (five of eight) of H's paths have a cost of 2. Hence, node G will have a lower P_ave value than node H. Hence, using P_ave as a tie breaker will advantageously result in node G being selected as the recommended root node.

Figure 6B:
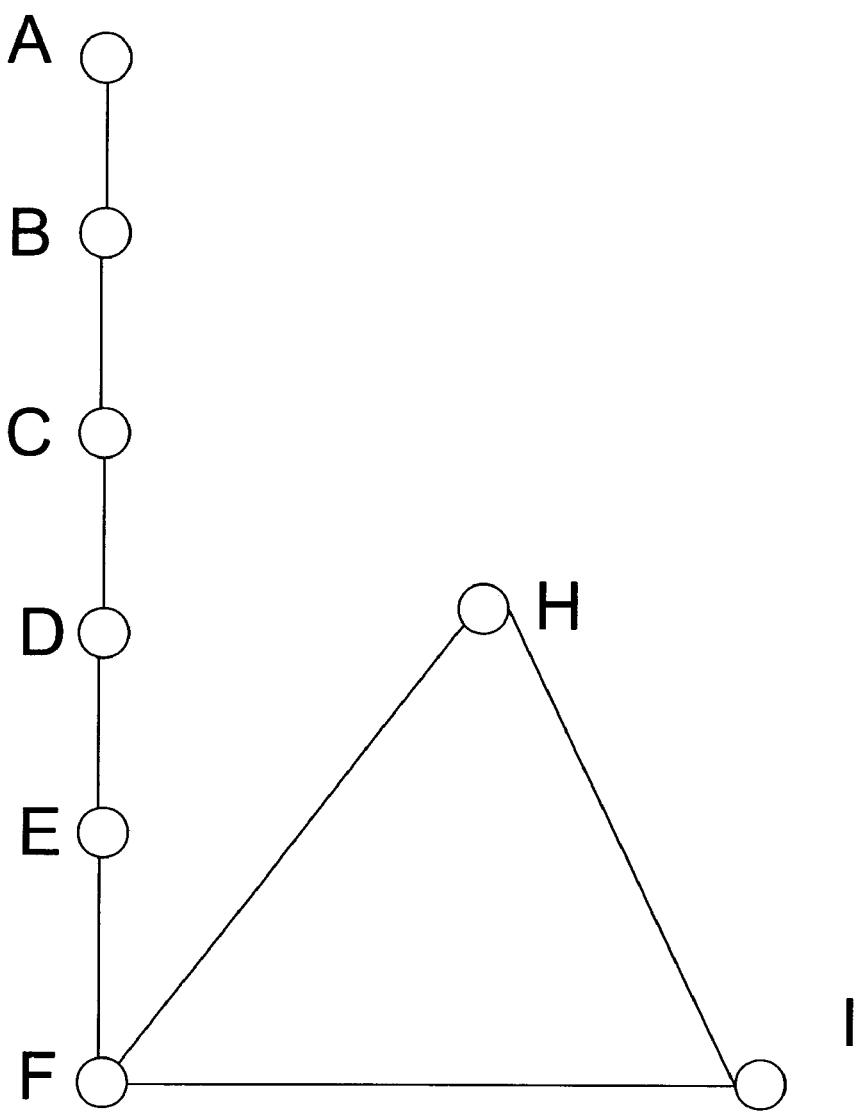
FIG. 6B depicts the example network topology after pruning.

Note that in the topology of FIG. 6A, the choice for recommended backup node would be node H based on its low value of P_max. However, the only time the backup root is useful if the primary root has failed. Hence, in accordance with the pruning procedure discussed above, the topology may be pruned by removing node G and its links. The pruned topology is depicted in FIG. 6B. Under the pruned topology, P_max for node H becomes 6 (H-F-E-E-C-B-A). The node with the lowest P_max under the pruned topology is node D which has P_max=3 under the pruned topology. Hence, node D may be advantageously selected as the recommended backup root.

FIG. 2 is a diagram depicting an example network topology 200 for discussing the operation of the disclosed technique in accordance with an embodiment of the invention. The example network 200 includes six switches (bridges) 202 with seven communication links 204 interconnecting them as shown.

The six switches 202 are labeled A, B, C, D, E and F. A first link 204-1 interconnects Switch A 202-A and Switch B 202-B. A second link 204-2 interconnects Switch B 202-B and Switch C 202-C. A third link 204-3 interconnects Switch C 202-C and Switch F 202-F. A fourth link 204-4 interconnects Switch F 202-F and Switch E 202-E. A fifth link 204-5 interconnects Switch B 202-B and Switch E 202-E. A sixth link 204-6 interconnects Switch E 202-E and Switch D 202-D. Finally, a seventh link 204-7 interconnects Switch D 202-D and Switch A 202-A.

For simplicity of explanation, let us assume that all the seven links 204 have equal cost. With this simplifying assumption of equal-cost links, the cost may be computed by counting how many links are "hopped" in going from one switch to another switch.

Consider Switch A 202-A as a candidate root node. A simulation of a spanning tree with Switch A 202-A as the root results in a maximum number of hops in the tree (i.e. P_max) of three (3) hops (to go from Switch A to Switch F). Similarly, simulation of spanning trees with Switch C 202-C, Switch D 202-D, or Switch F 202-F as the root also results in a maximum number of hops in the tree of three (3) hops.

On the other hand, consider Switch B 202-B as a candidate root node. A simulation of a spanning tree with Switch B 202-B as the root results in a maximum number of hops in the tree (i.e. P_max) of two (2) hops (to go from Switch B to Switch D or Switch F). Similarly, simulation of a spanning tree with Switch E 202-E as the root also results in a maximum number of hops in the tree of two (2) hops.

Hence, using the algorithm discussed above in relation to FIG. 1, either Switch B or Switch E has the best optimality based on the lowest maximum cost (P_max). In this particular instance, since all the costs are assumed to be the same, Switch B and Switch E tie for the best optimality, so one may be arbitrarily chosen as the recommended root node and the other may be arbitrarily chosen as the recommended back-up root node. The arbitrary choice between the two may be performed, for example, based on their MAC addresses.

Figure 3:
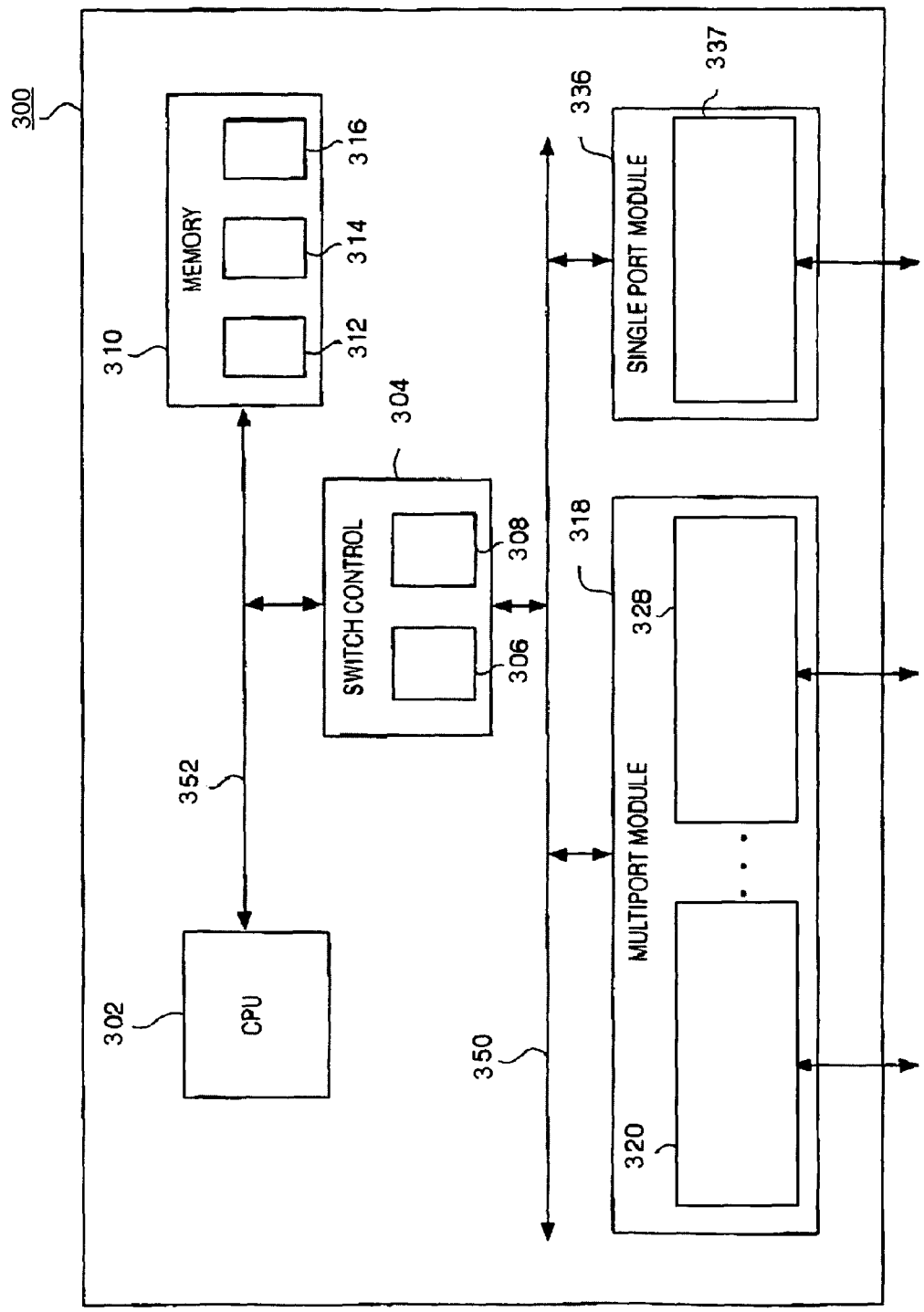
FIG. 3 is a schematic diagram of an example conventional switch which may be a node of a spanning tree.

FIG. 3 is a diagram of an example conventional switch 300 which may be a node of a spanning tree. The specific configuration of the switches, bridges, or similar such network devices within a network will vary depending on the specific implementation of the network.

A central processing unit (CPU) 302 performs overall configuration and control of the switch 300 operation. The CPU 302 operates in cooperation with switch control 304, an application specific integrated circuit (ASIC) designed to assist CPU 302 in performing packet switching at high speeds required by modern networks.

The switch control 304 controls the "forwarding" of received packets to appropriate locations within the switch for further processing and/or for transmission out another switch port. Inbound and outbound high speed FIFOs (306 and 308, respectively) may be included with the switch control 304 for exchanging data over a switch bus 350 with port modules.

Memory 310 may include inbound/outbound queues 312, various processor-executable code routines 314, and other data 316. A communications bus 352 may interconnect the CPU 302, switch control 304, and memory 310.

The ports of the switch may be embodied as plug-in modules that connect to the switch bus 350. Each such module may be, for example, a multi-port module 318 having a plurality of ports (for example, 320 through 328) in a single module or may be a single port module 336 having a single port 337.

As packets are received from a port, the packet data may be applied to the switch bus 320 in such a manner as to permit monitoring of the packet data by switch control 304. The switch control 304 may be configured to manage access to switch bus 350 by all port modules (i.e., 318 and 336). All port modules may "listen" to packets as they are received and applied by a receiving port module to switch bus 350.

Figure 4:
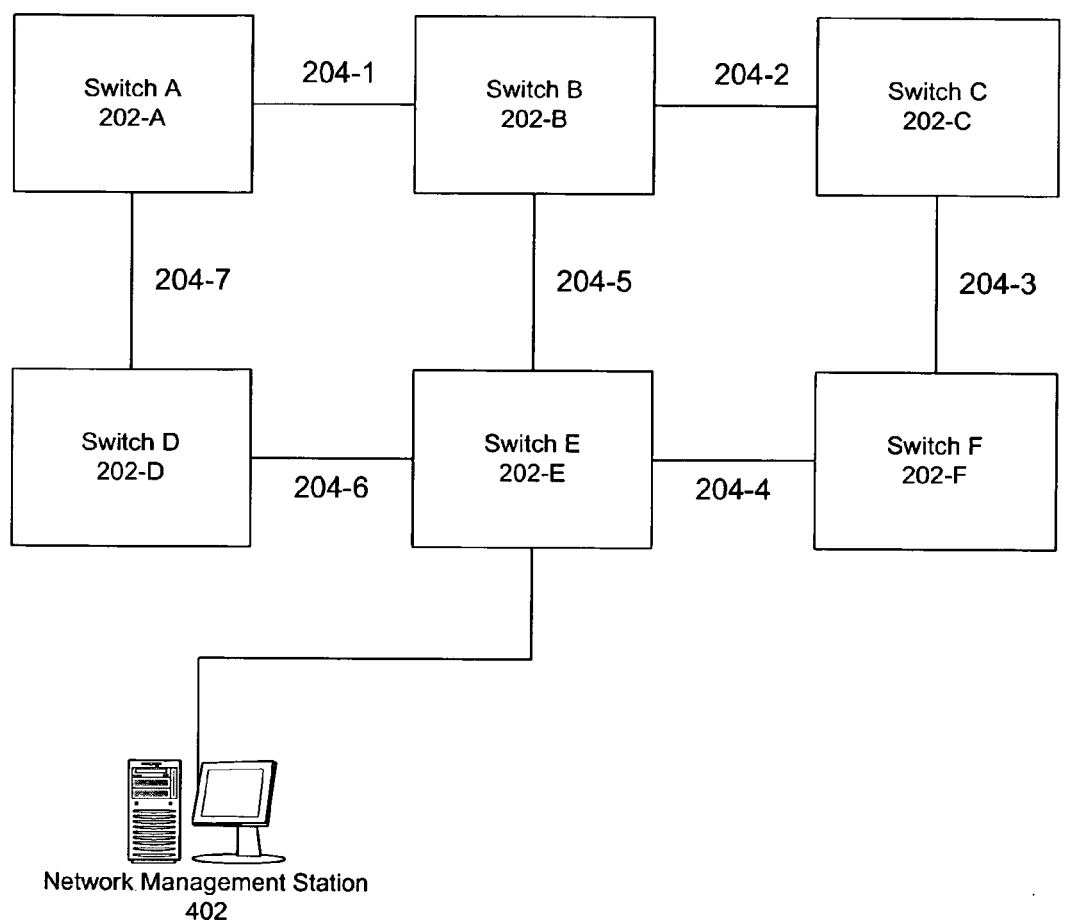
FIG. 4 is a schematic diagram which shows a network management station communicatively interconnected to the example network of FIG. 2.

FIG. 4 is a diagram which shows a network management station communicatively interconnected to the example network of FIG. 2. In this example, the network management station comprises a server 402 which is interconnected to Switch E. (Of course, the server could be interconnected to any other of the switches instead.) The server 402 executes network management software so as to manage the network.

FIG. 5 is a schematic diagram of an example network management station 402 in accordance with an embodiment of the invention. In this example, the network management station includes a processor 502, memory 504, communication bus(es) 506, input/output interfaces 508, a display 510, a keyboard 512, and a mouse 514.

The memory 504 is configured to store processor-executable code 505 and data. The communication bus or buses 506 are configured to communicatively couple components within the apparatus, such as the processor, memory and input/output interfaces. The input/output interfaces 508 includes at least one port communicatively coupled to another device in the network. The port may comprise, for example, an ethernet type port.

The processor-executable code 505 in the memory 504 may be configured to perform each of the steps shown in FIG. 1 and discussed above in relation thereto. For example, the processor-executable code 505 may be configured to simulate 104 spanning trees with different nodes as the root node. The processor-executable code 505 may also be configured to compute 106 an optimality criterion for each simulated spanning tree. And so on for the other steps in the method 100 of FIG. 1. By executing this code 505, the network management station 402 becomes capable of selecting an optimal or near-optimal root node of the network which is being managed.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of selecting a root node for a spanning tree, the method comprising:
   simulating spanning trees with different nodes as the root node at a network management station;
   calculating an optimality criterion for each simulated spanning tree at a network management station;
   comparing the calculated optimality criterion for the simulated spanning trees;
   determining a simulated spanning tree with a best optimality criterion;
   calculating a secondary optimality criterion as a tie breaker if more than one node has a same best optimality criterion, wherein the best optimality criterion comprises a lowest maximum cost along any branch of the simulated spanning tree associated with the more than one node having the same best optimality criterion, and wherein the secondary optimality criterion comprises a lowest average cost along any branch of the simulated spanning tree associated with each of the more than one node having the same optimality criterion; selecting a corresponding node corresponding to the best optimality criterion or the secondary optimality criterion as the root node;

selecting a corresponding node corresponding to the best optimality criterion or the secondary optimality criterion as the root node;

creating a pruned network topology by removing the selected root node; and selecting a backup root node based on the pruned network topology.

2. The method of claim 1, further comprising determining a network topology including nodes and links therebetween.

3. The method of claim 2, wherein the network topology determination is performed using link layer discovery protocol (LLDP).

4. The method of claim 1, wherein selecting a backup root node comprises determining a simulated spanning tree with a next best optimality criterion and selecting a corresponding node as the backup root node.

5. The method of claim 1, wherein the spanning tree simulation is performed using processor-executable code for spanning tree protocol (STP).

6. The method of claim 1, wherein the spanning tree simulation is performed using processor-executable code for rapid spanning tree protocol (RSTP).

7. A network management apparatus for a network, the apparatus comprising:
   a processor;
   memory for storing processor-executable instructions and data;
   a communication system for communicatively coupling components within the apparatus; and
   at least one port communicatively coupled to another device in the network,
   wherein the memory includes:
     processor-executable code configured to simulate spanning trees with different nodes as the root node,
     processor-executable code configured to calculate an optimality criterion for each simulated spanning tree,
     processor-executable code configured to determine a simulated spanning tree with a best optimality criterion,
     processor-executable code configured to calculate a secondary optimality criterion as a tie breaker if more than one node has a same best optimality criterion, wherein the best optimality criterion comprises a lowest maximum cost along any branch of the simulated spanning tree associated with the more than one node having the same best optimality criterion, and wherein the secondary optimality criterion comprises a lowest average cost along any branch of the simulated spanning tree associated with each of the more than one node having the same optimality criterion,
     processor-executable code configured to select a corresponding node corresponding to the best optimality criterion or the secondary optimality criterion as the root node, and
     processor-executable code configured to create a pruned network topology by removing the selected root node, and select a backup root node based on the pruned network topology.

8. The apparatus of claim 7, further comprising processor-executable code configured to determine a network topology including nodes and links therebetween.

9. The apparatus of claim 8, wherein the network topology determination is performed using link layer discovery protocol (LLDP).

10. The apparatus of claim 7, wherein the processor-executable code configured to select a backup node comprises processor-executable code configured to determine a simulated spanning tree with a next best optimality criterion and to select a corresponding node as the backup root node.

11. The apparatus of claim 7, wherein the spanning tree simulation is performed using processor-executable code for spanning tree protocol (STP).

12. The apparatus of claim 7, wherein the spanning tree simulation is performed using processor-executable code for rapid spanning tree protocol (RSTP).

13. A network management station of selecting a root node for a spanning tree, the network management station comprising:
   means for discovering a network topology including nodes and links therebetween;
   means for executing spanning tree protocol simulations with different nodes as the root node;
   means for computing an optimality criterion for each simulated spanning tree;
   means for comparing the calculated optimality criterion for the simulated spanning trees;
   means for determining a simulated spanning tree with a best optimality criterion;
   means for computing a secondary optimality criterion as a tie breaker if more than one node has a same best optimality criterion, wherein the best optimality criterion comprises a lowest maximum cost along any branch of the simulated spanning tree associated with the more than one node having the same best optimality criterion, and wherein the secondary optimality criterion comprises a lowest average cost along any branch of the simulated spanning tree associated with each of the more than one node having the same optimality criterion,
   means for selecting a corresponding node corresponding to the best optimality criterion or the secondary optimality criterion as the root node;
   means for creating a pruned network topology by removing the selected root node; and
   means for selecting a backup root node based on the pruned network topology.

* * * * *

UNITED STATES PATENT AND TRADEMARK OFFICE
CERTIFICATE OF CORRECTION

PATENT NO. : 8,203,970 B2
APPLICATION NO. : 11/581974
DATED : June 19, 2012
INVENTOR(S) : Ghanwani et al.

Page 1 of 1

It is certified that error appears in the above-identified patent and that said Letters Patent is hereby corrected as shown below:

In the Claims

In column 7, lines 2-5, in Claim 1, after "criterion;" delete "selecting a corresponding node corresponding to the best optimality criterion or the secondary optimality criterion as the root node;".

Signed and Sealed this
Twenty-second Day of October, 2013

Teresa Stanek Rea
*Deputy Director of the United States Patent and Trademark Office*